United States Patent Office 3,723,154
Patented Mar. 27, 1973

3,723,154
PHOTOGRAPHIC ELEMENTS CONTAINING COMPOUNDS DERIVED FROM CYANOMETHYL SULFONES
Gene L. Oliver, Pittsford, N.Y., assignor to Eastman Kodak Company, Rochester, N.Y.
No Drawing. Filed June 21, 1971, Ser. No. 155,294
Int. Cl. G03c 1/84
U.S. Cl. 117—33.3     12 Claims

ABSTRACT OF THE DISCLOSURE

Merocyanine dyes derived from certain cyanomethylsulfone compounds are useful as ultraviolet filter dyes, especially for photographic elements. 2,2'-bis-{[3-(3-sulfopropyl) - 2 - thiazolidinylidene]ethylidene}-2,2'-decamethylenedisulfonyl)diacetonitrile, disodium salt and tetramethylene bis{11 - {3-[3-(3-sulfopropyl)-2-thiazolidinylidene]-1 - cyanopropenylsulfonyl}undecanoate}, disodium salt are illustrative of the filter dyes of the invention.

This invention relates to compounds useful as filter dyes and to photographic element containing said dyes in a hydrophilic colloid layer.

The compounds of the invention, broadly speaking, are merocyanine dyes derived from certain cyanomethylsulfones described hereinafter. They absorb ultraviolet light and have properties which make them useful filter dyes. Although the dye compounds of the invention appear to be primarily useful with respect to light-sensitive silver halide color films; if desired, they can be incorporated in light-sensitive silver halide black and white films.

As is known to those skilled in the photographic art silver halide emulsions are sensitive to ultraviolet light. Color films such as Kodachrome and Ektachrome, for example, would be adversely affected by ultraviolet light unless protected therefrom. To illustrate, if ultraviolet light is not prevented from reaching the silver halide containing layers of a color film, such as those just mentioned, the film will be more bluish than it should be. Snow, for example, will have a bluish cast. Similarly, blacktop driveways will have a bluish apperance.

From the foregoing brief discussion it will be apparent that to obtain color pictures of true color rendition ultraviolet light should be prevented from reaching the silver halide containing layers of the color film.

In my U.S. Pat. 3,486,897 patented Dec. 30, 1969 dye compounds useful as ultraviolet filter dyes are disclosed. These dye compounds are derived from cyanomethylsulfone compounds. The dye of Example 9, 2-(3-cyano-3-dodecylsulfonylallylidene) - 3 - (3 - sulfopropyl)thiazolidine, potassium salt, is particularly useful for the reasons which follow. Its absorption maximum is 382 nm. in methanol and its absorption curve shape in a gelatin coating is such that its absorption cuts off sharply near 400 nm. It is thus essentially colorless. It is otherwise photographically inert; it is practically water insoluble and has low diffusibility. However, it has a high degree of detergency, a property which hinders coating, for example, of hydrophilic coiloid solution such as gelatin coating solutions and causes foaming in processing solutions in which it dissolves.

This invention describes new compounds derived from cyanomethylsulfones which are useful as ultraviolet filter dyes and which have water solubility, low diffusibility and low detergency. The compounds of the present invention minimize the detergency while maintaining the low diffusibility and the same light-absorption properties as the ultraviolet filter dye compounds of my U.S. Pat. 3,486,897.

It is an object of my invention to provide new compounds which are useful ultraviolet filter dyes.

Another object is to provide new compounds which are useful in making photographic elements.

Another object is to provide a process for preparing the new compounds of my invention.

A further object is to provide photographic elements comprising a support having thereon at least one ultraviolet filter layer consisting essentially of a hydrophilic colloid and at least one of the new dye compounds of my invention.

The foregoing objects are illustrative and not limitative of the objects of my invention.

The novel compounds of the invention include those having the general formula:

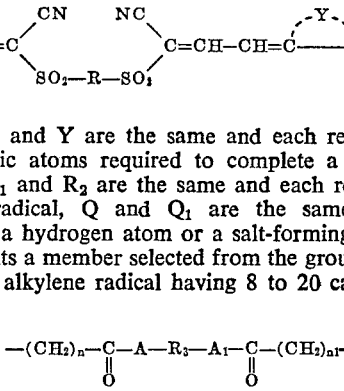

wherein X and Y are the same and each represents the non-metallic atoms required to complete a thiazolidine nucleus, $R_1$ and $R_2$ are the same and each represents an alkylene radical, Q and $Q_1$ are the same and each represents a hydrogen atom or a salt-forming cation and R represents a member selected from the group consisting of (1) an alkylene radical having 8 to 20 carbon atoms and (2)

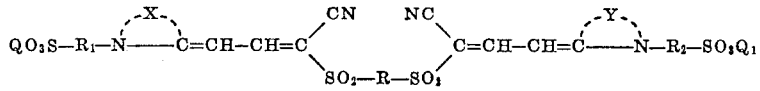

wherein A and $A_1$ each represents O or $$\begin{matrix} R' \\ N \end{matrix}$$

wherein R' is H or lower alkyl, $R_3$ represents a divalent radical selected from the group consisting of an alkylene radical having 2 to 20 carbon atoms, a cycloalkylene radical having 5 to 6 carbon atoms, an arylene radical having 6 to 18 carbon atoms, a mixed alkyl and aryl radical having 8 to 20 carbon atoms and a mixer alkyl and cycloalkyl radical having 8 to 20 carbon atoms, wherein $n$ and $n_1$ each represents a whole positive number of at least 1 and wherein the sum of $n$ and $n_1$ and the number of carbon atoms of $R_3$, collectively, represent a whole positive number of from about 10 to 30.

Ethylene, trimethylene, tetramethylene, pentamethylene, hexamethylene, heptamethylene, octamethylene, decamethylene, undecamethylene, dodecamethylene, tridecamethylene, tetradecamethylene, pentadecamethylene, hexadecamethylene, heptadecamethylene, octadecamethylene, non-adecamethylene and decyldecamethylene, for example, are illustrative of the alkylene radicals $R_3$ can be.

Cyclopentylene and cyclohexylene are illustrative, for example, of the cycloalkylene radicals $R_3$ can be Phenylene, methyphenylene, naphthylene, biphenylylene, anthrylene, phenanthrylene and terphenylanthrylene, for example, are illustrative of the arylene radicals $R_3$ can be.

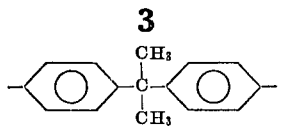

for example, are illustrative of the mixed alkyl and aryl radicals which $R_3$ can be.

Cyclohexylenedimethylene, i.e.

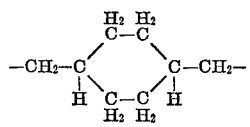

for example, is illustrative of the mixed alkyl and cycloalkyl radicals $R_3$ can be.

When R' is a lower alkyl radical it can be methyl, ethyl, propyl, isopropyl, butyl, t-butyl, pentyl, or hexyl, for example.

The compounds of the present invention can be prepared by reacting an anhydro-2-(2-anilinovinyl)-3-(sulfoalkyl)-2-thiazolinium hydroxide with an appropriate cyanomethylsulfone compound in the presence of a basic condensing agent such as a trialkylamine, e.g. triethylamine, tri-n-propylamine, tri-n-butylamine, etc., N-methylpiperidine, N-ethylpiperidine, N,N-diethylaniline, etc. Two gram moles of the anhydro compound to one gram mole of the cyanomethylsulfone compound is ordinarily employed in preparing the compounds of the invention.

Anhydro - 2 - (2 - anilinovinyl) - 3 - (3 - sulfopropyl)-2-thiazolinium hydroxide, anhydro-2-(2-anilinovinyl)-3-(3-sulfobutyl)-2-thiazolinium hydroxide, anhydro-2-(2-anilinovinyl)-3-(4-sulfobutyl)-2 - thiazolinium hydroxide and anhydro-2-(2-anilinovinyl-3-(2-sulfoethyl-2-thiazolinium hydroxide, for example, are illustrative, but not limitative, of the anhydro compounds used in preparing the compounds of the invention.

The reaction used in preparing the compounds of my invention is conveniently carried out in the presence of an inert solvent medium, for example, an alkanol such as methanol, ethanol, propanol, or butanol, acetone, 1,4-dioxane, pyridine, dimethylformamide, dimethylacetamide, quinoline, and the like, at elevated temperatures. The desired compounds formed are separated from the reaction mixtures using known procedures illustrated in Examples 1–4 and can be purified in known fashion by one or more recrystallization from suitable solvents such as the solvents named hereinbefore.

The following examples further illustrate the compounds of the invention and their preparation.

EXAMPLE 1

2,2' - bis{[3 - (3 - sulfopropyl) - 2 - thiazolidinylidene]-ethylidene} - 2,2' - (decamethylenedisulfonyl)diacetonitrile, disodium salt

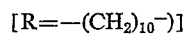

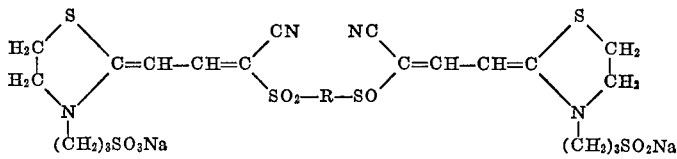

Anhydro - 2 - (2 - anilinovinyl) - 3 - (3 - sulfopropyl)-2-thiazolinium hydroxide (4.56 g., 14 mmol), decamethylenedisulfonyldiacetonitrile (2.44 g., 7 mmol), acetic anhydride (2.0 ml.), and triethylamine (4.9 ml.) were heated in dimethylacetamide (10 ml.) solution for 10 minutes at 110–120° and cooled. On dilution with three volumes of ether, the dye was thrown out of solution and the solvent decanted. The residue was washed twice with ether and then dissolved in absolute ethanol. The sodium salt was prepared by adding a solution of 2.1 g. sodium iodide dissolved in a minimum amount of ethanol. The solution was heated to boiling and enough water added to just dissolve the dye. On cooling a yield of 2.90 g. (48%) of the dye was obtained. After two recrystallizations from 85% aqueous ethanol, it melted at 178° dec. The absorption and photographic data are given in Tables I and II hereinafter.

EXAMPLE 2

Tetramethylene bis{11 - {3-[3-(3-sulfopropyl)-2-thiazolidinylidene] - 1 - cyanopropenylsulfonyl}undecanoate}, disodium salt

[R=—$(CH_2)_{10}$—CO—O—
   $(CH_2)_4$—O—CO—$(CH_2)_{10}$—)]

Anhydro - 2 - (2 - anilinovinyl) - 3 - (3 - sulfopropyl)-2-thiazolinium hydroxide (4.5 g., 7 mmol), tetramethylene bis [11-(cyanomethylsulfonyl)undecanoate] (2.22 g., 3.5 mmol), acetic anhydride (1.0 ml.) and triethylamine (2.9 ml.) were heated in dimethylformamide (10 ml.) solution for 10 minutes gradually rising from 80° to 110°. The dye was isolated and purified as in Example 1. The yield was 3.41 g. (85%). The purified dye fused at 78–80° melting eventually around 140°. Absorption data is in Table I.

EXAMPLE 3

4,4' - biphenylylene bis{6-{3-[3-(3-sulfopropyl)-2-thiazolidinylidene] - 1 - cyano-1-propenylsulfonyl}, disodium salt

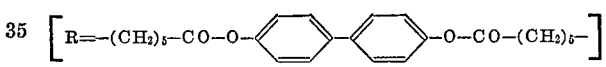

Anhydro - 2 - (2-anilinovinyl) - 3 - (3-sulfopropyl)-2-thiazolinium hydroxide (3.26 g.,, 10 mmol), 4,4'-biphenylylene bis[11-(cyanomethylsulfonyl)hexanoate] (2.94 g., 5 mmol), acetic anhydride (1.4 ml.) and triethylamine (4.2 ml.) were heated in dimethylacetamide (15 ml.) solution at 100–120° for 5 minutes. The dye was thrown out of solution with ether and the residue washed with ether. The residue was dissolved in a 5:1 mixture of chloroform and methanol. This solution was chromatographed on a silica gel column. The desired dye is eluted by the same solvent mixture, leaving the major impurity, the thiazolinocarbocyanine, on the column. About 250 ml. of solution was collected and the solvent distilled off. The residue was dissolved in ethanol and enough water added to dissolve it. An ethanolic solution of sodium iodide (1.5 g.) was added to give the sodium salt which was filtered off and dried. The yield of pure dye thus obtained was 4.1 g. (75%), M.P. 164–8° dec. Absorption data is in Table I.

EXAMPLE 4

N,N' - phenylenebis{6-{3-[3-(3-sulfopropyl) - 2 - thiazolidinylidene] - 1 - cyano - 1 - propenylsulfonyl} hexanamide}, disodium salt

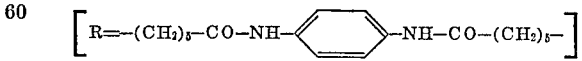

Anhydro - 2 - (2 - anilinovinyl)-2-(3-sulfopropyl) - 2-thiazolinium hydroxide (3.26 g., 10 mmol), N,N'-phenylenebis-[6-(cyanomethylsulfonyl)hexanamide] (2.56 g., 5 mmol), acetic anhydride (1.4 ml.), and triethylamine (4.2 ml.) were heated over 10 minutes in the range 90–125° in dimethylacetamide (15 ml.) solution. The dye was isolated and chromatographed as in Example 3, using 750 ml. of eluting solvent. The yield was 2.7 g. (53%) of purified dye, M.P. 263–265° dec. Absorption data is in Table I.

The compounds of this invention have light-absorbing characteristics that make them valuable for use in light-absorbing filter layers in photographic elements. These characteristics are illustrated in the following Table I.

TABLE I.—ABSORPTION SPECTRA IN METHANOL

| Dye of Example No. | $\lambda_{max.}$ (nm.) | $\times 10^{-4}$ coefficient of extinction |
| --- | --- | --- |
| 1 | 383 | 6.0 |
| 2 | 382 | 5.7 |
| 3 | 381 | 5.4 |
| 4 | 381 | 5.3 |

Photographic data is given in Table II which follows:

TABLE II.—PHOTOGRAPHIC DATA

| Element | Maximum density (fresh test) | | |
| --- | --- | --- | --- |
| | Red | Green | Blue |
| Control | 3.03 | 2.86 | 3.59 |
| Dye of example 1 | 3.31 | 2.86 | 3.86 |
| Dye of example 9 [1] | 3.15 | 3.12 | 3.84 |

[1] Of U.S. Pat. 3,486,897, patented December 30, 1969. Testing of each element was done under the same conditions described in Example 13 of U.S. Pat. 3,486,897.

The following examples illustrate the preparation of the cyanomethylsulfone compounds used in preparing the dye compounds of the invention.

EXAMPLE 5

Decamethylenedisulfonyldiacetonitrile

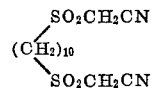

Sodium (11.5 g., 0.5 mole) was dissolved in 200 ml. methanol. Decane-1,10-dithiol (51.8 g., 0.25 mole) was then added and the mixture heated to reflux with stirring. A solution of chloroacetonitrile (31.6 ml., 0.5 mole) in 50 ml. methanol was added dropwise over 30 minutes and the refluxing solution stirred for 2 hours. The warm solution was filtered to remove sodium chloride and the filtrate evaporated to dryness. The residue was dissolved in 100 ml. glacial acetic acid. This solution was added dropwise to a solution of commercial 30% hydrogen peroxide (136 g., 1.2 moles) in 550 ml. glacial acetic acid at 35–45° over one hour. The mixture was allowed to stir at 40° for an additional hour and at room temperature overnight. The product, which crystallized out as the reaction proceeded, was filtered off and dried. The yield was 71.0 g. (81%). An infrared spectrum disclosed that the product had a substantial absorption band at 1043 cm.$^{-1}$ attributed to sulfoxides. For 21 hours at 50–55°, 9.5 g. of the above material was stirred with 8.1 g. 30% hydrogen peroxide in acetic acid. On cooling, 8.0 g. was recovered, whose absorption spectrum showed much less sulfoxide in relation to the sulfone bands (1130, 1345 cm.$^{-1}$) in the infrared. M.P. 146–148°.

EXAMPLE 6

6-(cyanomethylsulfonyl)hexanoyl chloride

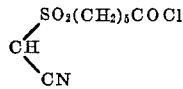

6-mercaptohexanoic acid (85.1 g., 0.58 mole) was dissolved in 500 ml. methanol containing sodium methoxide (62.1 g.). To this solution heated to reflux was added a solution of chloroacetonitrile (36.3 ml., 0.58 mole) in 50 ml. methanol over about 15 minutes. After refluxing for an additional hour, the methanol was removed in vacuo and the residue dissolved in water. After acidification with hydrochloric acid, the aqueous solution was extracted with dichloromethane and ether. The extracts were dried over anhydrous sodium sulfate, filtered and evaporated to dryness. The residue weighed 110.7 g. It was then dissolved in 150 ml. glacial acetic acid and added dropwise to a stirred solution of 30% hydrogen peroxide (156 g.) in acetic acid (750 ml.) in a 2.1. round bottom flask, heated previously to 45° C. Ice cooling was provided to keep the temperature at 55–60° C. for two hours, the mixture was concentrated to near dryness, diluted with cold water, and filtered. Yield: 68.1 g. (54%). Low melting solid.

The acid chloride was prepared by refluxing the above acid (30.7 g.) with thionyl chloride (70 ml.) for one hour on the steam bath. When the excess thionyl chloride was removed on a rotary evaporator, the acid chloride was obtained as an oil in nearly quantitative yield. The oil was used without further purification in subsequent reactions.

EXAMPLE 7

4,4'-biphenylylene bis[6-(cyanomethylsulfonyl)-hexanoate]

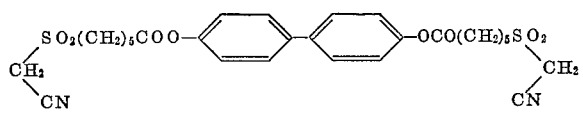

6-(cyanomethylsulfonyl)hexanoyl chloride (8.3 g., 0.035 mole) and 4,4'-dihydroxybiphenyl (3.3 g., 0.018 mole) were refluxed in benzene (60 ml.) for about an hour and cooled. The solid which separated was filtered off and dried. Recrystallized from 100 ml. of 1:1 ethanol/acetonitrile, the compound, melting at 148–150°, was obtained in 62% yield (6.4 g.).

EXAMPLE 8

N,N'-phenylenebis[6-(cyanomethylsulfonyl)hexanamide]

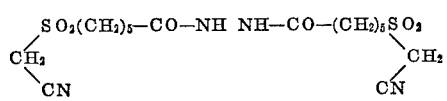

6 - (cyanomethylsulfonyl)hexanoyl chloride (8.3 g., 0.035 mole) dissolved in dichloromethane (10 ml.) was added proportionwise with ice bath cooling to a solution of p-phenylenediamine (3.3 g., 0.018 mole) in pyridine (5.6 ml., 0.07 mole) and dichloromethane (70 ml.). The product precipitated as formed during the reaction wherein the temperature ranged 15–30°. The mixture was refluxed for 30 minutes and cooled. The pyridine salts were extracted out with water. The precipitate was filtered off. Recrystallized from 50% aqueous pyridine, 4.9 g. (55%) of product was obtained melting at 208–210° dec.

EXAMPLE 9

11-(cyanomethylsulfonyl)undecanoic acid

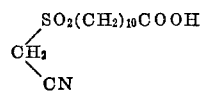

This compound was prepared by a sequence of well-known reactions beginning with 11-bromoundecanoic acid. The bromo-acid was converted to 11-mercaptoundecanoic acid using the thiouronium salt method. The reaction with chloroacetonitrile and subsequent oxidation was carried out essentially as in the preparation of 6-(cyanomethylsulfonyl)hexanoyl chloride. The oxidation was carried out in 86% yield from the 11-(cyanomethylthio)undecanoic acid., M.P. 126–128°.

EXAMPLE 10

Tetramethylene bis[11-cyanomethylsulfonyl) undecanoate]

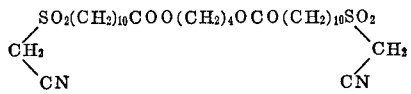

11-(cyanomethylsulfonyl)undecanoic acid (6.0 g., 0.02 mole) was refluxed and stirred with thionyl chloride (9 ml.) in 10 ml. dichloromethane for 6 hours at 50° and let stand overnight. The excess solvent and thionyl chloride were removed in vacuo. The acid chloride, a low melting solid, was heated with 1,4-butanediol (0.9 g., 0.01 mole), initially in 15 ml. dichloromethane, at 50–70° for 3 hours. The residue was recrystallized from ethyl acetate yielding 4.2 g. (66%).

The cyanomethylsulfone compounds specifically described in Examples 5–10 are illustrative and not limitative of the cyanomethylsulfone compounds that can be used in preparing the dye compounds of the invention.

When Q and $Q_1$ each represents a salt-forming cation each can be an alkali metal ion such as Na+, K+, Li+, etc.; an ammonium ion such as ammonium, trimethylammonium, triethylammonium, tetramethylammonium, tetraethylammonium, benzyltrimethylammonium, a piperidinium ion (e.g., piperidinium, N-methyl-piperidinium, N-ethyl-piperidinium), a morpholinium ion (e.g., morpholinium) or a pyrrolidinium ion (e.g., pyrrolidinium), for example, or a cyclic immonium ion such as a pyridinium ion (e.g., pyridinium, α-methylpyridinium, β-methylpyridinium, γ-methylpyridinium, N-methylpyridinium, N-ethylpyridinium, etc.) or a quinolinium ion (e.g., quinolinium, N-methylquinolinium, N-ethylquinolinium, etc.) for example.

It will be understood that the compounds having a salt-forming cation can have any of the salt-forming cations set forth hereinbefore. Usually the salt-forming cation will be an alkali metal ion such as Na+ and K+.

The invention has been described in considerable detail with particular reference to certain preferred embodiments thereof, but it will be understood that variations and modifications can be effected within the spirit and scope of the invention as described hereinbefore.

I claim:

1. A photographic element comprising a support having thereon at least one ultraviolet filter layer consisting essentially of a hydrophilic colloid and at least one compound having the formula

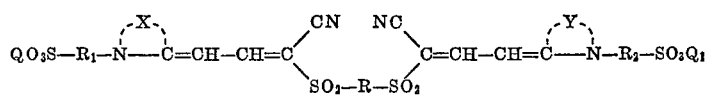

wherein X and Y are the same and each represents the nonmetallic atoms required to complete a thiazolidine nucleus, $R_1$ and $R_2$ are the same and each represents an alkylene radical, Q and $Q_1$ are the same and each represents a hydrogen atom or a salt-forming cation and R represents a member selected from the group consisting of (1) an alkylene radical having 8 to 20 carbon atoms and (2)

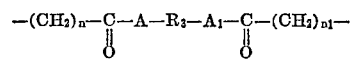

wherein A and $A_1$ each represents O or

wherein R' is H or lower alkyl, $R_3$ represents a divalent radical selected from the group consisting of an alkylene radical having 2 to 20 carbon atoms, a cycloalkylene radical having 5 to 6 carbon atoms, an arylene radical having 6 to 18 carbon atoms, a mixed alkyl and aryl radical having 8 to 20 carbon atoms and a mixed alkyl and cycloalkyl radical having 8 to 20 carbon atoms, wherein n and $n_1$ each represents a whole positive number of at least 1 and wherein the sum of n and $n_1$ and the number of carbon atoms of $R_3$, collectively, represents a whole positive number of from about 10 to 30.

2. A photographic element comprising a support having thereon at least one ultraviolet filter layer consisting essentially of gelatin and at least one compound having the formula in accordance with claim 1 wherein Q and $Q_1$ each represents a salt-forming cation.

3. A photographic element comprising a support having thereon at least one ultraviolet filter layer consisting essentially of gelatin and at least one compound having the formula in accordance with claim 1 wherein Q and $Q_1$ each represents an alkali metal.

4. A photographic element comprising a support having thereon at least one ultraviolet filter layer consisting essentially of gelatin and at least one compound having the formula in accordance with claim 1 wherein R represents an alkylene radical having 8 to 20 carbon atoms and wherein Q and $Q_1$ each represents a salt-forming cation.

5. A photographic element comprising a support having thereon at least one ultraviolet filter layer consisting essentially of gelatin and at least one compound having the formula in accordance with claim 1 wherein R represents —$(CH_2)_{10}$— and wherein Q and $Q_1$ each represents a salt-forming cation.

6. A photographic element comprising a support having thereon at least one ultraviolet filter layer consisting essentially of gelatin and at least one compound having the formula in accordance with claim 1 wherein R represents

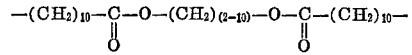

and wherein Q and $Q_1$ each represents a salt-forming cation.

7. A photographic element comprising a support having thereon at least one ultraviolet filter layer consisting essentially of gelatin and at least one compound having the formula in accordance with claim 1 wherein R represents

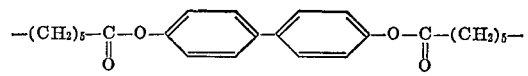

and Q and $Q_1$ each represents a salt-forming cation.

8. A photographic element comprising a support having thereon at least one ultraviolet filter layer consisting essentially of gelatin and at least one compound having the formula in accordance with claim 1 wherein R represents

and Q and $Q_1$ each represents a salt-forming cation.

9. A photographic element comprising a support having thereon at least one ultraviolet filter layer consisting essentially of gelatin and the compound 2,2'-bis{[3-(3-sulfopropyl) - 2-thiazolidinylidene]ethylene}-2,2'-(decamethylenedisulfonyl)diacetonitrile, disodium salt.

10. A photographic element comprising a support having thereon at least one ultraviolet filter layer consisting essentially of gelatin and the compound tetramethylene bis-{11-{3-[3-(3-sulfopropyl) - 2 - thiazolidinylidene]-1-cyanopropenylsulfonyl}undecanoate}, disodium salt.

11. A photographic element comprising a support having thereon at least one ultraviolet filter layer consisting essentially of gelatin and the compound 4,4'-biphenylylene bis-{6-{3-[3-(3-sulfopropyl) - 2 - thiazolidinylidene-1-cyano-1-propenylsulfonyl}hexanoate}, disodium salt.

12. A photographic element comprising a support having thereon at least one ultraviolet filter layer consisting essentially of gelatin and the compound N,N'-phenylene-bis-{6-{3-[3-(3-sulfopropyl) - 2 - thiazolidinylidene]-1-cyano-1-propenylsulfonyl}hexanamide}, disodium salt.

References Cited

UNITED STATES PATENTS

| 3,555,016 | 1/1971 | Peter et al. | 260—240.9 |
| 3,629,274 | 12/1971 | Oliver | 96—84 R |
| 3,652,284 | 3/1972 | Oliver | 96—84 R |

FOREIGN PATENTS

| 615,414 | 1/1961 | Italy | 260—240.9 |
| 1,097,421 | 2/1955 | France | 96—84 R |

RONALD H. SMITH, Primary Examiner

U.S. Cl. X.R.

96—84 R; 252—300; 260—240.4